United States Patent
Lieberman et al.

(10) Patent No.: US 9,026,401 B2
(45) Date of Patent: May 5, 2015

(54) MONITORING MEMORY MODULE PARAMETERS IN HIGH PERFORMANCE COMPUTERS

(75) Inventors: Donald A. Lieberman, San Jose, CA (US); Daniel R. Solvin, Fremont, CA (US)

(73) Assignee: Cosair Memory, Inc., Fremont, CA (US)

( * ) Notice: Subject to any disclaimer, the term of this patent is extended or adjusted under 35 U.S.C. 154(b) by 524 days.

(21) Appl. No.: 12/636,673

(22) Filed: Dec. 11, 2009

(65) Prior Publication Data

US 2011/0144950 A1    Jun. 16, 2011

(51) Int. Cl.
G06F 11/30    (2006.01)
G06F 11/34    (2006.01)

(52) U.S. Cl.
CPC ............ *G06F 11/348* (2013.01); *G06F 11/349* (2013.01); *G06F 2201/81* (2013.01)

(58) Field of Classification Search
USPC ......... 702/57, 58, 64, 65, 74, 80, 82, 99, 104, 702/116, 119, 130, 132, 136, 183, 188, 702/189; 327/89; 374/163, 166
See application file for complete search history.

(56) References Cited

U.S. PATENT DOCUMENTS

| | | | |
|---|---|---|---|
| 5,910,737 A * | 6/1999 | Kesler | 327/89 |
| 6,236,393 B1 * | 5/2001 | Ogawa et al. | 345/211 |
| 6,480,946 B1 | 11/2002 | Tomishima et al. | |
| 6,930,554 B2 * | 8/2005 | Mondal et al. | 330/282 |
| 2003/0212474 A1 * | 11/2003 | Pippin | 700/300 |
| 2004/0007326 A1 * | 1/2004 | Roche et al. | 156/345.24 |
| 2006/0045168 A1 * | 3/2006 | Socci et al. | 374/163 |
| 2006/0239095 A1 * | 10/2006 | Shi et al. | 365/222 |
| 2007/0047378 A1 | 3/2007 | Wolford et al. | |
| 2007/0211548 A1 | 9/2007 | Jain et al. | |
| 2008/0267258 A1 * | 10/2008 | Hokenmaier | 374/166 |
| 2009/0024790 A1 | 1/2009 | Rajan et al. | |

OTHER PUBLICATIONS

PCT/US11/33082, PCT International Search Report dated Jul. 20, 2011.
PCT/US11/33082, PCT Written Opinion of the Internatioanl Search Authority dated Jul. 20, 2011.

* cited by examiner

*Primary Examiner* — Mohamed Charioui
(74) *Attorney, Agent, or Firm* — Sheppard Mullin Richter & Hampton LLP (57) ABSTRACT

Monitoring parameters of memory modules is described. According to certain embodiments, one or more parameters on respective memory modules are monitored. Corresponding parameter information is transmitted away from the respective memory module to a device that is external to the respective memory modules.

20 Claims, 5 Drawing Sheets

MONITORING MEMORY MODULE PARAMETERS IN HIGH PERFORMANCE COMPUTERS

TECHNICAL FIELD

The present invention is directed to the use of memory modules, and more specifically to the monitoring of memory modules.

BACKGROUND

Individual assembly of one's own personal computers may be achieved by purchasing and assembling motherboards, power supplies, video cards, disk drives, memory modules and other components, to which a keyboard, display monitor, and mouse may be connected. In such an assembly, many of the computer's internal operating parameters may be monitored. Monitoring such parameters can be especially important to the builders of high performance systems where such parameters are used to optimize overall system performance. One such parameter to monitor is the activity of one or more memory modules which represents how much use a particular memory module is experiencing in various computing tasks. Other parameters include the temperature or the power supply voltage of the memory module. Indicators can be placed on the printed circuit board of each memory module to monitor such parameters of the memory module. However, there is often limited room on the circuit board, and the cost of adding one or more of these indicators to each memory module along with the associated display electronics can be prohibitive.

In view of the foregoing, there is a need for a cost-effective device, system and method for remotely monitoring memory module parameters.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known methods, procedures, components, and circuits have not been described in detail so as not to unnecessarily obscure aspects of the embodiments.

According to some embodiments, one or more parameters on one or more memory modules are monitored, and the corresponding parameter information is transmitted away from each of respective memory modules that are being monitored to a device that is external to the respective memory modules.

According to some embodiments, memory activity can be measured by counting the assertions of the high frequency Chip Select ($\overline{CS}$) signals during the execution of various applications. The rate at which the chip select signals are asserted can be converted to a visual display. Colored indicators can be lit to represent greater memory module activity, for example. According to certain embodiments, the indicators can be implemented using an accessory circuit and associated display electronics that is remote from the memory module that is being monitored. Utilizing an accessory circuit that is remote from the memory module will not only result in valuable savings in real estate on the memory module but will also result in considerable cost savings as explained herein.

According to certain embodiments, the chip select input signals ($\overline{CS}$) on a given memory module can be detected and compared with a corresponding threshold value. Corresponding output signals (CS) can be generated based on such a comparison, wherein the output signals form at least a subset of the parameter information. According to certain embodiments, the output signals can be routed to a connector on the given memory module for transmission over a cable to an accessory module that is remote from the given memory module.

According to certain embodiments, a differential pair of transistors can be configured as a comparator on a given memory module for comparing the chip select input signals ($\overline{CS}$). The threshold value of the comparator can be established by the reference voltage $V_{Ref}$. According to certain other embodiments, the threshold value for comparison on a given memory module is programmable. For example, the reference voltage $V_{Ref}$ may be generated by implementing a voltage divider on the given memory module as described herein.

According to some embodiments, a comparator circuit includes a power supply and ground potential, a connector node coupled to an output node, and a differential pair of transistors configuration coupled between the power supply and ground potential and coupled to the output node. The differential pair of transistors configuration provides, at the output node, an inverted chip select output signal relative to the chip select input signal. The differential pair of transistors configuration is further housed on a memory module.

According to some embodiments, a differential pair of transistors configured as a comparator comprises a first transistor coupled to the power supply, and having an emitter, base and collector. The base of the first transistor is configured to receive a chip select input signal from a plurality of chip select signals and the collector of the first transistor is coupled to the output node. The differential pair of transistors includes a second transistor, coupled in parallel to the first transistor and having an emitter, base and collector. The base of the second transistor is configured to receive a reference signal, the emitter of the second transistor is coupled to the emitter of the first transistor, and the collector of the second transistor is coupled to ground. The differential pair of transistors further includes a resistive element coupled in series with the collector of the first transistor and coupled to the ground potential.

According to some embodiments, a comparator system is on a memory module. The comparator system includes a first comparator. The first comparator comprises a first input port for receiving at least one chip select input signal detected from the memory module. The first comparator also comprises a second input port for receiving a reference signal indicative of a threshold value to compare to the respective chip select input signal. An output port of the first comparator generates a respective chip select output signal based on the respective input signal compared to the threshold value. A connector is coupled to the output port to route the respective chip select output signal off the memory module.

Figure 1:
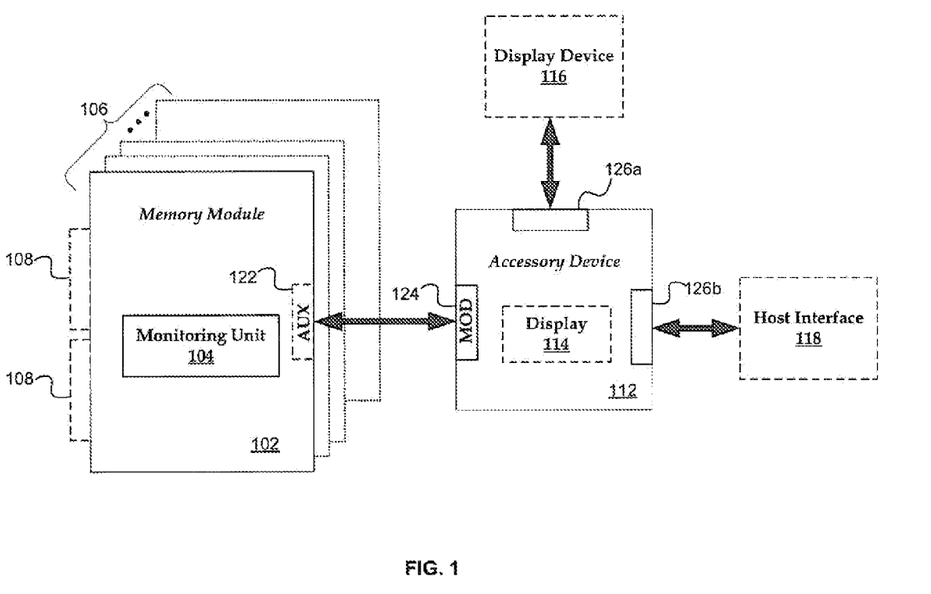
FIG. 1 is high-level block diagram illustrating a connection between a memory module, housing a monitoring unit, and an external accessory device, according to certain embodiments.

FIG. 1 is high-level block diagram illustrating a connection between a memory module 102, housing a monitoring unit 104, and an external aggregating accessory unit, such as accessory device 112, which may comprise a display component 114, according to some embodiments. The memory module 102 may be any memory module known in the art, including but not limited to Dual in-line package memory, Single In-line Pin Package memory (SIPP), Single Inline Memory Module (SIMM), Dual Inline Memory Module (DIMM), Small outline DIMM (SO-DIMM), and so on; or any other packaging or assembly of memory devices DRAM, SRAM, Flash, and so on. In some embodiments, the memory module 102 includes connectors 108 that allow the memory module 102 to be connected to a motherboard of a larger computer system. In some embodiments, the connection between the memory module 102 and the accessory device 112 is provided via an auxiliary connector 122 on the memory module 102 and a memory module connector 124 (MOD) on the accessory device 112.

The monitoring unit 104 comprises a simple, inexpensive circuit that can be included in the memory module 102 with little impact to the overall real estate of the circuit board. The monitoring unit 104 allows for detecting memory module activity and other parameters, such as changes in temperature or the supply voltage level of the memory module 102. The monitoring unit 104 may be configured to transmit the detected parameter information over a connection to the accessory device 112 at auxiliary connector 122. In some embodiments, the parameter information is transmitted wirelessly from the memory module 102 to the accessory device 112. In some embodiments, a system may include a plurality of memory modules 106. Each monitoring unit 104 may be placed on each of the plurality of memory modules 106. According to certain embodiments, the accessory device 112 may aggregate the parameter information from the plurality of memory modules 106 for display. Alternatively, the accessory device 112 may have a connection port 126b to connect to the motherboard of the computer whereby software running on the computer may display the information to the system user.

The monitoring unit 104 includes a circuit for the remote monitoring of activity in a corresponding memory module 102. Memory module activity may be measured by counting the number of assertions of the high frequency Chip Select ($\overline{CS}$) signals during the execution of various applications that use the memory module. In some embodiments, there may be more than one chip select signal for each memory module 102. Each chip select signal may represent the activity of a portion of the memory module. For example, in a typical 16-chip memory module (512 MB), there are two chip select signals for each DRAM memory module having 16 chip parts. Thus, each chip select signal represents the activity of half of the DRAM memory module.

In some embodiments, the monitoring unit 104 may also include a thermocouple, thermistor or other devices for measuring the temperature of the module. In some embodiments, the monitoring unit 104 may also include a connection to the supply voltage provided to the memory module.

The accessory device 112 may be a display device or may include a display component 114. The accessory device 112 is separate from the memory module 102, and may be configured to connect to the memory module 102 via auxiliary connector 122, as previously described. The accessory device 112 may be connected to the memory module 102 at any time since, unlike the memory module 102, it is not required for computer operation. The display component 114 may include one or more colored indicators that respond to received chip select signals from the monitoring unit 104 to represent the level of memory module activity of a corresponding memory module. In addition, the display component 114 may include indicators for showing temperature information and power supply information. In some embodiments, the accessory device 112 may be configured to connect to a separate display device 116 via connector 126a. Connector 126a can be any type of connector known in the art, including but not limited to an Inter-Integrated Circuit (I2C) connector.

In some embodiments, the accessory device 112 may include a microprocessor (not shown), analog-to-digital converters (not shown) or other circuitry to measure the parameters present on the connections to the memory modules 102. Such measurements could then be displayed on digital readout devices present on the accessory device 112 (i.e., display component 114), displayed on a digital readout device separate from the accessory device 112 (i.e., display device 116) or communicated to a computer via a standard interface such as host interface 118. The host interface 118 may be connected to the accessory device 112 via any standard connection 126b known in the art, (e.g., Universal Serial Bus).

Figure 2:
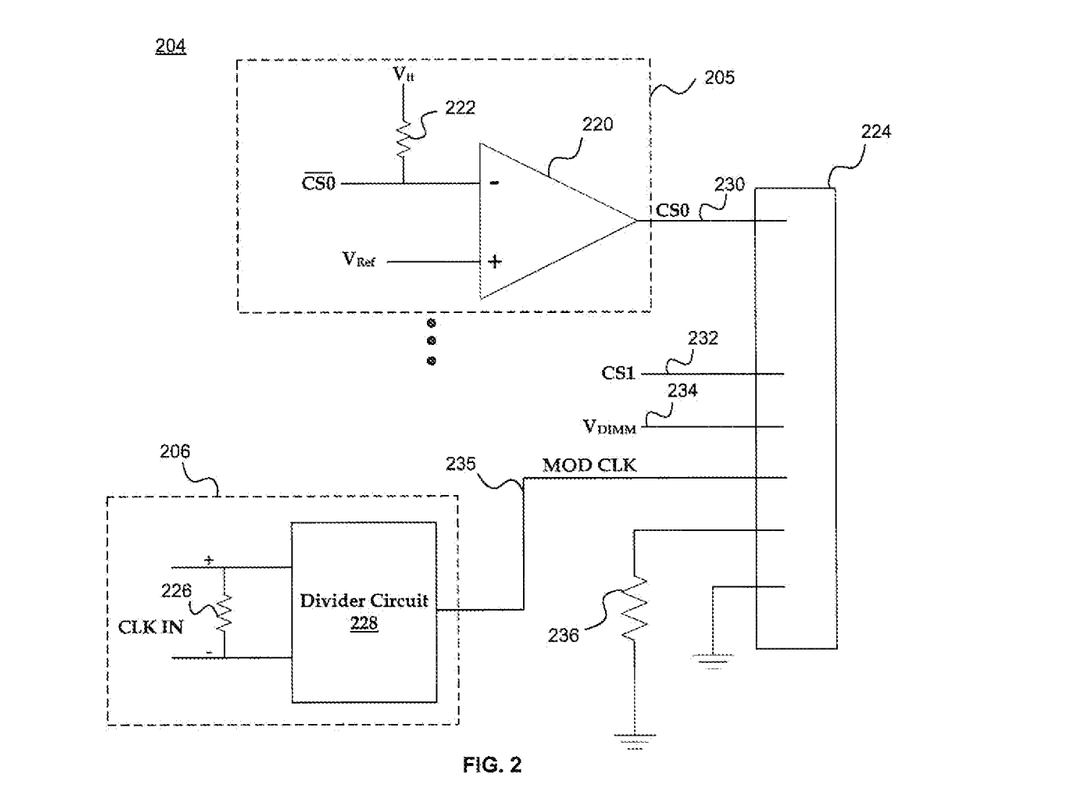
FIG. 2 is a high-level schematic illustrating an inverting comparator utilized in the monitoring unit of the memory module in FIG. 1, according to certain embodiments.

FIG. 2 is a high-level schematic illustrating an inverting comparator circuit 204 that may be utilized in the monitoring unit 104 of FIG. 1, according to certain embodiments. The comparator circuit 204 includes comparator 220, which is a high speed inverting comparator that may be used to buffer and invert the chip select signal $\overline{CS0}$ to output an inverted signal CS0. The chip select signal $\overline{CS0}$ may represent the activity of a portion of the memory module 102, as described in previous sections. It will be appreciated that the each memory module 102 may include a plurality of chip select signals $\overline{CS0}$, $\overline{CS1}$, $\overline{CS2}$ ..., and so on, corresponding to size or the number of chips on the memory module 102. For example, in a 16-chip memory module, there may be two chip select signals $\overline{CS0}$ and $\overline{CS1}$, where $\overline{CS0}$ services a first portion (8 chips) and $\overline{CS1}$ services a second portion (8 chips) of the memory module 102. A first comparator circuit 205 may be included in the memory module 102 to output a first inverted output signal CS0 at output port 230 and routed to connector 224. In some embodiments, a second comparator circuit (not shown) may be included in the memory module 102 to output a second inverted output signal CS1 at output port 232 (in response to receiving a second chip select signal $\overline{CS1}$), and also routed to connector 224.

The comparator 220 receives the chip select $\overline{CS0}$ signal as one of its input signals. A resistor 222 is additionally coupled between the $\overline{CS0}$ input signal of the comparator 220 and a power supply to terminate the signal in its characteristic impedance at the input and avoid signal reflection. A reference voltage $V_{Ref}$ is received as its second input, and is used as the threshold for the comparison. In some embodiments, the reference voltage $V_{Ref}$ may be generated by voltage divider. The output signal CS0 of comparator 204 is routed to a connector 224 for transmission off the module 102. It will be appreciated that additional comparator circuits (not shown) would be configured in a similar manner. In some embodiments, the output signals of the additional comparator circuits may be routed to the same connector 224.

The connector 224 may include additional interconnections to circuitry of the memory module 102. In some embodiments, the connector 224 may be connected to a temperature measuring device, such as thermistor 236, for measuring the temperature of the memory module 102. Temperature information may be routed off the module 102 via the connector 224 to be processed or to monitor the temperature externally from the memory module 102. In some embodiments, the connector 224 may include a connection 234 to the power supply $V_{DIMM}$ of the memory module 102 so that the memory module voltage may also be monitored externally.

In some embodiments, the connector 224 may be connected to an output port 235 configured to receive a clock signal MOD CLK from the memory module 102. Receiving the clock signal MOD CLK at connector 224 illustrates remote monitoring of one or more clock signals on the memory module 102. For example, in the case of DRAM on a DIMM module, the connector 224 may receive a DIMM Module Clock signal as the MOD CLK signal, which can be transmitted off the memory module 102 to be monitored remotely such as by accessory device 112. In some embodiments, a divider circuit 228 may be included in the monitoring unit 104 and utilized to divide a differential clock signal CLK IN generated in the memory module 102 to reduce the frequency of the clock signal when it is received by the connector 224. The differential clock signal CLK IN may be terminated by termination resistor 226 at the input port of the divider circuit 228 to prevent signal reflections. The divider circuit 228 may be any circuit known in the art to convert the output to a desired or more useful frequency, such as a binary divider (e.g., ripple counter) or other types of counters. For example, if an existing clock generator on the memory module 102 provides a differential clock signal in the 1-2 GHz range, and the divider circuit 228 is a binary divider that divides the clock signal, the clock signal can be divided to a range of 10-20 MHz. The lower frequency is received by the connector 224 to transmit off module.

Upon receiving the various parameter information, connector 224 may transmit the parameter information or a subset of the parameter information off module to the accessory device 112 or any other device that may utilize, process or display the parameter information. In some embodiments, the transmission of the parameter information from the connector 224 to the accessory device 112 is over a hardwire or cable. In some embodiments, the parameter information is transmitted wirelessly from the connector 224.

Figure 3:
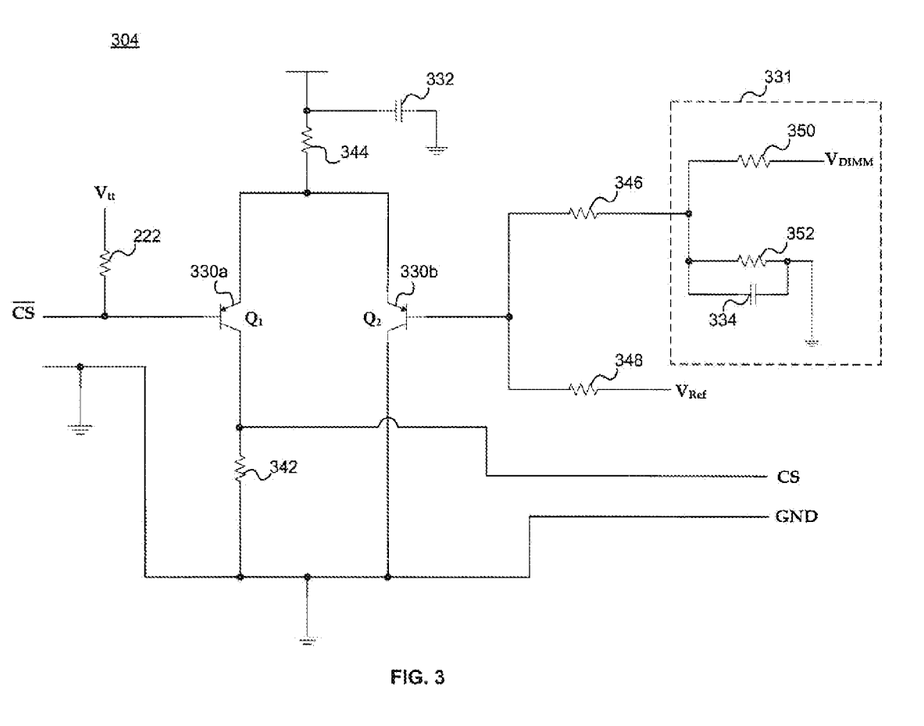
FIG. 3 is a schematic illustrating a monitoring circuit in a memory module of FIG. 1, according to certain embodiments.

FIG. 3 is a detailed schematic illustrating a monitoring circuit 304 in memory module 102 of FIG. 1 capable of generating a buffered inverted signal relative to the chip select signal $\overline{CS}$, according to certain embodiments. A differential pair of transistors 330a ($Q_1$) and 330b ($Q_2$) between a power supply and ground form a comparator, such as comparator 220. In one leg of the differential pair, transistor 330a ($Q_1$) is coupled in series to resistor 342. The other end of the resistor 342 is connected to ground. In the other leg of the differential pair, transistor 330b ($Q_2$) is connected to ground. Additionally, transistors 330a (Q1) and 330b (Q2) have their emitters tied together and to resistor 344. The other end of resistor 344 is tied to the power supply where it is decoupled by capacitor 332 to reduce noise. The resistor 344 may be substituted by any impedance component or combination of components known in the art, including but not limited to one or more of resistors, transistors, capacitors or combination thereof. The base of transistor 330a ($Q_1$) receives, as a first input of the comparator in monitoring circuit 304, a chip select signal $\overline{CS}$ from the host memory module 102. The base of transistor 330b ($Q_2$) is configured to receive, as a second input of the comparator in the monitoring circuit 304, a reference voltage $V_{Ref}$.

As in FIG. 2, the $\overline{CS}$ signal is additionally coupled to a second power supply potential $V_{tt}$ via resistor 222. The $\overline{CS}$ signal is terminated in its characteristic impedance with resistor 222 connected to power supply potential $V_{tt}$ to prevent signal reflections.

The threshold of the comparator in the monitoring circuit 304 can be established by the reference voltage $V_{Ref}$. In some embodiments, the threshold is set by selecting $V_{Ref}$, which is predetermined or preselected in accordance with device parameters. The selection of $V_{Ref}$ is achieved by installing or configuring a resistor 348 to allow $V_{Ref}$ to be applied to the base of transistor 330b ($Q_2$), and by omitting a resistor 346. Resistor 348 may be installed as a zero-ohm resistor to enable the selection of $V_{Ref}$.

In some embodiments, by installing the resistor 346 and omitting. the resistor 348, the threshold for the comparator in the monitoring circuit 304 may be configured by a voltage divider 331 formed by resistors 350 and 352. Resistor 346 may be a zero-ohm resistor, which may be installed to enable the voltage divider 331 configuration for threshold recognition. Resistor 350 is connected to $V_{DIMM}$, the main voltage supply of the host memory module 102. Resistor 352 is connected to ground. The parallel combination of the resistor 352 and capacitor 334 is configured to filter out noise. The voltage divider 331 configuration allows for recognition of any threshold between 0 and $V_{DIMM}$, and thus allows the threshold of the comparator in the monitoring circuit 304 to be programmable. The versatility of varying the comparator threshold by the voltage divider 331 allows for increasing noise immunity if necessary. Additionally, the implementation of a comparator using a discrete differential pair of transistors coupled with careful selection of those transistors, such as in the monitoring circuit 304, allows for achieving switching frequencies in the range of 50-100 MHz. The implementation of the monitoring circuit 304 costs only a few cents so as not to greatly increase the overall cost of the memory module 102.

In order to turn the transistor 330a ($Q_1$) OFF, the transistor 330b ($Q_2$) must be turned ON. It will be appreciated that a transistor turns ON when the voltage from base to emitter achieves a minimum required $V_{BE}$, and turns OFF when the voltage from base to emitter is less than the minimum required $V_{BE}$. Thus, in operation, when $Q_1$ is OFF and $Q_2$ is ON, the emitter-to-base voltage of $Q_2$ has achieved at least the minimum required voltage $V_{BE}$. Thus, the emitter voltage of $Q_2$ is $V_{Ref}+V_{BE}$. The emitter of $Q_1$ is equal to the emitter of $Q_2$, since the emitters share the same node. Consequently, since $Q_1$ is OFF, the emitter-to-base voltage of the $Q_1$ is less than the minimum voltage $V_{BE}$, requiring that the base voltage of $Q_1$ be higher than $V_{Ref}$. Therefore, when the received $\overline{CS}$ signal is high the transistor 330a ($Q_1$) is OFF.

When the transistor 330a ($Q_1$) is OFF, no current flows through the collector and emitter of $Q_1$, and no current flows through the resistor 342. Since there is no voltage drop across the resistor 342, the collector of $Q_1$ is pulled toward ground, causing the output signal CS to be low. In summary, when the input signal $\overline{CS}$ is high (i.e., voltage is higher than $V_{Ref}$), the output signal CS is low.

Similarly, when the transistor 330a (Q1) receives a low $\overline{CS}$ signal, the emitter-to-base voltage of $Q_1$ requires at least the minimum required voltage $V_{BE}$ to turn ON $Q_1$. This causes the emitter of $Q_1$, and consequently the emitter of $Q_2$, to be less than $V_{Ref}+V_{BE}$. The emitter-to-voltage of $Q_2$ does not achieve the minimum voltage $V_{BE}$ since its base is fixed to $V_{Ref}$. Thus, the transistor 330b ($Q_2$) is turned OFF.

When the transistor 330a ($Q_1$) is ON, current flows through its emitter and collector, which causes a voltage drop across the resistor 342. The output signal CS, which is tied to the collector of $Q_1$ is asserted high. In summary, when the input signal $\overline{CS}$ is low (i.e., voltage is less than $V_{Ref}$), the output signal CS is high. Thus, the input signal $\overline{CS}$ is inverted as buffered output signal CS.

Figure 4:
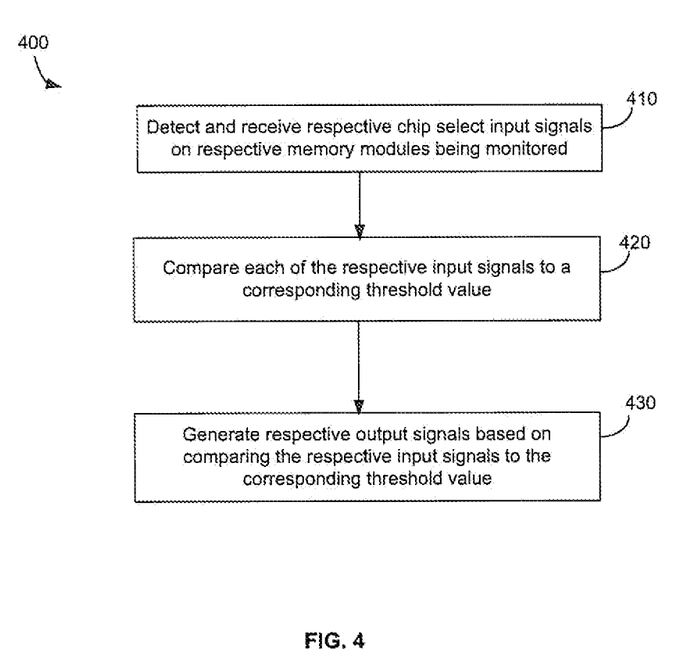
FIG. 4 is a flow diagram illustrating the operation of the monitoring circuit of FIG. 3, according to certain embodiments.

FIG. 4 is a flow diagram illustrating the operation of the monitoring circuit 304 of FIG. 3, according to certain embodiments. At 410, the chip select input signal is detected and received. At 420, the received input signal is compared to a threshold value. According to certain embodiments, the threshold value is programmable. At 430, a buffered output signal is generated based on the comparison performed at 420. At 440, the buffered output signal is routed to a connection for transmission over a cable to area outside the memory module.

Figure 5:
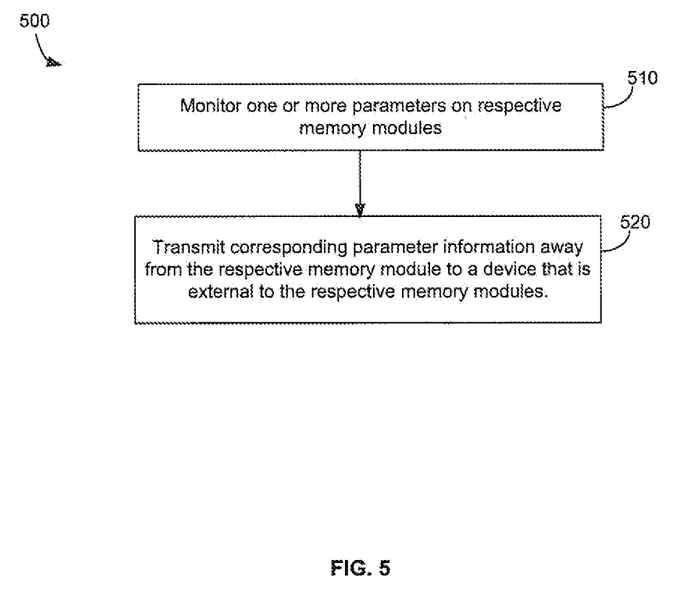
FIG. 5 is a flow diagram illustrating the operation of the monitoring circuit of FIG. 3, according to other embodiments.

FIG. 5 is a flow diagram illustrating the operation of the monitoring circuit 304 of FIG. 3, according to other embodiments. At 510, one or more parameters on respective memory modules are monitored. At step 520, corresponding parameter information is transmitted away from the respective memory module to a device that is external to the respective memory modules.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
monitoring one or more parameters on at least one respective memory module using an electronic apparatus that includes a differential pair of transistors configuration coupled between a power supply and ground potential and coupled to an output node, the differential pair of transistors configuration being housed on the respective memory module and wherein the differential pair of transistors configuration is operable to provide at the output node an inverted chip select output signal relative to a chip select input signal;
using a voltage divider coupled to a base of a second transistor of the differential pair and operable to provide as a reference signal a programmable reference voltage between zero and an operating voltage of the respective memory module;
using a first resistor configurable to be coupled to the base of the second transistor and the voltage divider;
using a second resistor configurable to be coupled to the base of the second transistor, and further coupled to a preselected reference voltage, wherein the first resistor is installed when the programmable reference voltage is applied and the second resistor is installed when the preselected reference voltage is applied; and
transmitting corresponding parameter information away from the respective memory module to a device that is external to the respective memory modules, wherein the device only functions to display the monitored behavior of the respective memory module.

2. The method of claim 1, further comprising:
detecting and receiving respective chip select input signals on the respective memory modules that are being monitored;
comparing each of the respective input signals to a corresponding threshold value; and
generating respective output signals based on comparing the respective input signals to the corresponding threshold value, wherein the output signals form at least a subset of the parameter information.

3. The method of claim 2, wherein the corresponding threshold value is programmable.

4. The method of claim 2, further comprising buffering the respective output signals.

5. The method of claim 2, further comprising using at least one differential pair of transistors for each respective memory module that is being monitored, wherein the differential pair of transistors is configured as a comparator.

6. The method of claim 2, further comprising using a voltage divider for each respective memory module that is being monitored to vary the corresponding threshold value.

7. The method of claim 1, further comprising displaying the parameter information on the device that is external to the respective memory modules, wherein the parameter information includes at least a subset of temperature measurement, inverted chip select output signals, a memory module clock signal, and power supply information for each respective memory module that is being monitored.

8. The method of claim 1, wherein transmitting corresponding parameter information away from the respective memory module further comprises routing the parameter information to a respective connector associated with each respective memory module that is being monitored.

9. The method of claim 1, further comprising aggregating the parameter information from the two or more of the respective memory modules.

10. The method of claim 1, wherein transmitting corresponding parameter information away from the respective memory module comprises transmitting the corresponding parameter information wirelessly.

11. An apparatus comprising:
a power supply and ground potential;
a connector node coupled to an output node; and
a differential pair of transistors configuration coupled between the power supply and ground potential and coupled to the output node,
wherein, the differential pair of transistors configuration is operable to provide at the output node an inverted chip select output signal relative to a chip select input signal; and
wherein, the differential pair of transistors configuration is housed on a memory module;
a voltage divider coupled to a base of a second transistor of the differential pair and operable to provide as a reference signal a programmable reference voltage between zero and an operating voltage of the memory module;
a first resistor configurable to be coupled to the base of the second transistor and the voltage divider; and a second resistor configurable to be coupled to the base of the second transistor, and further coupled to a preselected reference voltage,
    wherein the first resistor is installed when the programmable reference voltage is applied; and
    wherein the second resistor is installed when the preselected reference voltage is applied.

12. The apparatus of claim 11, further comprising at least a subset of:
    a temperature measuring device coupled to the connector node, the temperature measuring device being operable to measure the temperature of the memory module; and
    a clock divider circuit coupled to the connector node, the clock divider circuit being operable to divide a received memory module clock signal.

13. The apparatus of claim 12, wherein the connector node is coupled to an accessory device, the accessory device being configured to receive parameter information of the memory module, and operable to provide a representation of the received parameter information.

14. The apparatus of claim 13, wherein the accessory device is configured to receive as parameter information of the memory module, at least a subset of temperature measurements from the temperature measuring device, the inverted chip select output signal of each of the plurality of chip select signals, the memory module clock signal, and power supply information from the memory module.

15. The apparatus of claim 13 further comprising a display device coupled to the accessory device, wherein the representation of the received parameter information is displayed on the display device associated with the accessory device.

16. The apparatus of claim 13 further comprising a host interface configured to associate with a computing device, wherein the computing device is configured to process the received parameter information of the memory module.

17. The apparatus of claim 11, wherein the differential pair of transistors configuration further comprises:
    a first transistor coupled to the power supply, and having an emitter, base and collector, wherein the base of the first transistor is configured to receive a chip select input signal from a plurality of chip select signals and the collector of the first transistor is coupled to the output node;
    the second transistor, coupled in parallel to the first transistor and having an emitter, base and collector, wherein the base of the second transistor is configured to receive a reference signal, the emitter of the second transistor is coupled to the emitter of the first transistor, and the collector of the second transistor is coupled to ground; and
    a resistive element coupled in series with the collector of the first transistor and coupled to the ground potential.

18. The apparatus of claim 11, further comprising an impedance component coupled to the power supply and to the differential pair of transistors configuration, wherein the impedance component is from at least a subset of a resistor, transistor, and capacitor.

19. The apparatus of claim 11, further comprising a plurality of memory modules, wherein each memory module includes at least one of the differential pair of transistors configuration.

20. The apparatus of claim 11, further comprising a display device coupled to the connector node, the display device configured to receive the inverted chip select output signal of each of the plurality of chip select signals, and operable to display a representation of the received inverted chip select output signals.

\* \* \* \* \*

UNITED STATES PATENT AND TRADEMARK OFFICE
CERTIFICATE OF CORRECTION

| | | |
|---|---|---|
| PATENT NO. | : 9,026,401 B2 | Page 1 of 1 |
| APPLICATION NO. | : 12/636673 | |
| DATED | : May 5, 2015 | |
| INVENTOR(S) | : Donald A. Lieberman et al. | |

It is certified that error appears in the above-identified patent and that said Letters Patent is hereby corrected as shown below:

ON THE TITLE PAGE

Item (73) Assignee:
"Cosair Memory, Inc." should read -- Corsair Memory, Inc. --.

Signed and Sealed this
Tenth Day of November, 2015

Michelle K. Lee
*Director of the United States Patent and Trademark Office*